Patented Apr. 26, 1927.

1,626,392

UNITED STATES PATENT OFFICE.

ROBERT G. CASWELL AND ELLSWORTH G. MARSHALL, OF WILMINGTON, DELAWARE, ASSIGNORS TO E. I. DU PONT DE NEMOURS & COMPANY, OF WILMINGTON, DELAWARE, A CORPORATION OF DELAWARE.

PROCESS OF MAKING BENZANTHRONE.

No Drawing. Application filed July 31, 1920. Serial No. 400,492.

This invention relates to the production of benzanthrone, and comprises reducing anthraquinone to anthranol in a medium of concentrated sulphuric acid, adding glycerol and water to the reaction mass, and effecting condensation of the glycerol and anthranol to form benzanthrone.

In a process heretofore known of producing benzanthrone, and similar to the one outlined above, the best yield obtained has been about 74%. We have discovered that by carefully following certain conditions of operation, a yield of benzanthrone amounting to 89% may be obtained.

Our invention may be illustrated by the following example (the parts being by weight):—

Three parts of anthraquinone (96–100% purity) are dissolved in about 44 parts of concentrated sulphuric acid (93 – 95% $H_2SO_4$) and to this solution are then added about 2 parts of freshly precipitated copper during one and one-half hours at 38–42° C. After all of the copper has been added the reaction mixture is kept at a temperature of from about 38 to 42° C. until solution of the copper in the sulfuric acid has reached completion, ordinarily about 3 hours.

A mixture of about 4 parts of water and about 4 parts of glycerol is then introduced during ½ hour into the sulphuric acid solution, during which addition the temperature of the mass is allowed to rise to from about 85–90° C. The temperature is then raised in the course of one and one-half hours from 90° C. to 120° C., the heating preferably being carried out in such a way that the temperature rises uniformly at the rate of 1° C. every three minutes. The reaction mass, after reaching about 120° C., is kept at 118–120° C. for from about 2 to 3 hours, after which it is cooled to about 60° C. and then drowned in water, and the resulting precipitate filtered and washed until the cake is free from acid.

The crude benzanthrone is then purified by boiling for about ¾ of an hour with about 50 parts of 1% caustic soda solution, followed by filtering and washing. The light yellowish green benzanthrone thus obtained has a melting point of 169–170° C. and contains from about 5 to 7% of a black residue insoluble in alcohol. The yield of benzanthrone is 89% of that required by theory.

The reduction of the anthraquinone to anthranol can be brought about with copper powder, granulated tin, etc., but we consider it advantageous to use freshly precipitated copper obtained, for example, by precipitation from a solution of copper sulphate. Copper prepared by this method has a fineness of 300 mesh.

Heretofore the glycerol has been added within a relatively short time after the addition of the reducing agent has been completed, whereas we have found it to be important to stir the mixture, to which all the copper has been added, for three hours at a temperature of 38–42° C., or at least until the copper is completely dissolved in the sulphuric acid solution.

The uniform rate of temperature increase from 90° to 120° after the introduction of the glycerin-water mixture is also important; and if the maximum yield is to be obtained, care should be taken not to allow the temperature to rise above 120 or 121° C., for at a temperature several degrees higher sulphonation appears to take place to an appreciable extent with a consequent detrimental effect on the yield and on the quality of the product.

We claim:—

1. A process of producing benzanthrone which comprises treating anthraquinone dissolved in concentrated sulphuric acid with freshly precipitated copper at a temperature of about 38–42° C., until solution of the copper in the sulphuric acid is substantially complete, gradually adding glycerol and water, and then gradually raising the temperature of the solution to about 120° C. and maintaining it at about this point until the reaction is completed.

2. A process of producing benzanthrone which comprises treating anthraquinone dissolved in about 15 times its weight of concentrated sulphuric acid with freshly precipitated copper at a temperature of about 38–42° C., until solution of the copper in the sulphuric acid is substantially complete, gradually adding glycerol and water gradually raising the temperature of the solution to about 120° C. and maintaining it at about this point until the reaction is completed.

3. A process of producing benzanthrone which comprises treating anthraquinone dissolved in concentrated sulphuric acid with freshly precipitated copper at a temperature of about 38-42° C., until solution of the copper in the sulphuric acid is substantially complete, gradually adding a mixture of glycerol and water while permitting the temperature to rise to about 85 to 90° C., then heating to cause an increase in temperature at the uniform rate of about 1° C. every three minutes until the temperature reaches about 120° C., and maintaining the temperature at about this point until the reaction is completed.

4. In the production of benzanthrone the step which comprises reducing anthraquinone dissolved in sulphuric acid of 93-95% strength with freshly precipitated copper while maintaining the temperature of the solution between about 38 and 42° C.

5. In the production of benzanthrone the steps which comprise dissolving 3 parts of anthraquinone in about 50 parts of sulphuric acid containing from 93 to 95% $H_2SO_4$, gradually adding about 2 parts of freshly precipitated copper in the course of about one and one-half hours, while keeping the solution at a temperature of between about 38 and 42° C., and maintaining the solution at said temperature after the addition of copper is completed until substantially all of said copper is dissolved.

In testimony whereof we affix our signatures.

ROBERT G. CASWELL.
ELLSWORTH G. MARSHALL.